US012800941B2

(12) United States Patent
Kobayashi

(10) Patent No.: US 12,800,941 B2

(45) Date of Patent: Nov. 17, 2026

(54) DIFFRACTIVE OPTICAL ELEMENT, OPTICAL SYSTEM, IMAGE PICKUP APPARATUS, AND DISPLAY APPARATUS

(71) Applicant: CANON KABUSHIKI KAISHA, Tokyo (JP)

(72) Inventor: Mikio Kobayashi, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 330 days.

(21) Appl. No.: 18/411,343

(22) Filed: Jan. 12, 2024

(65) Prior Publication Data

US 2024/0264459 A1 Aug. 8, 2024

(30) Foreign Application Priority Data

Jan. 27, 2023 (JP) ................................ 2023-010695

(51) Int. Cl.
*G02B 27/42* (2006.01)

(52) U.S. Cl.
CPC ................................ *G02B 27/4205* (2013.01)

(58) Field of Classification Search
CPC . G02B 27/4205; G02B 27/4211; G02B 27/42
See application file for complete search history.

(56) References Cited

U.S. PATENT DOCUMENTS 10,890,698 B2 * 1/2021 Kobayashi ........... G02B 5/1871
2002/0012170 A1 * 1/2002 Nakai .................. G02B 5/1866 359/569
2011/0304918 A1 * 12/2011 Ushigome ............ G02B 5/1895 359/576
2024/0264458 A1 8/2024 Kobayashi

FOREIGN PATENT DOCUMENTS

JP 2009-217139 A 9/2009
JP 2020-106562 A 7/2020
WO 2010/032347 A1 3/2010
WO 2010/087208 A1 8/2010

OTHER PUBLICATIONS

Notice of Reasons for Refusal issued by the Japanese Patent Office on Sep. 30, 2025 in corresponding JP Patent Application No. 2023-010695, with English translation.

* cited by examiner

*Primary Examiner* — Lucy P Chien

(74) *Attorney, Agent, or Firm* — Carter, DeLuca & Farrell LLP

(57) ABSTRACT

A diffractive optical element includes a first diffraction grating made of a first material, a second diffraction grating made of a second material, and a thin film layer. Grating slopes of the first diffraction grating and the second diffraction grating are in contact with each other via the thin film layer. The diffractive optical element includes a plurality of annular areas each including annuli arrayed in a radial direction, and array pitches of the annuli of each annular area are different from each other. Predetermined inequalities are satisfied.

17 Claims, 11 Drawing Sheets

DIFFRACTIVE OPTICAL ELEMENT, OPTICAL SYSTEM, IMAGE PICKUP APPARATUS, AND DISPLAY APPARATUS

BACKGROUND

Technical Field

One of the aspects of the embodiments relates to a diffractive optical element, an optical system, an image pickup apparatus, and a display apparatus.

Description of Related Art

Japanese Patent Laid-Open No. 2009-217139 discloses a diffractive optical element (DOE) that has high diffraction efficiency over the entire visible range by laminating diffraction gratings made of two different materials. PCT International Publication No. WO 2010/032347 discloses a DOE that improves diffraction efficiency by closely forming a diffraction grating made of another material onto a diffraction grating made of an injection molding material.

The DOE disclosed in Japanese Patent Laid-Open No. 2009-217139 is difficult to manufacture because a diffraction grating is formed on a substrate using a mold and many moldings are required. The DOE disclosed in PCT International Publication No. WO 2010/032347 is difficult to acquire sufficient diffraction efficiency due to molten penetration between the diffraction gratings.

SUMMARY

A diffractive optical element according to one aspect of the embodiment includes a first diffraction grating made of a first material, a second diffraction grating made of a second material, and a thin film layer. Grating slopes of the first diffraction grating and the second diffraction grating are in contact with each other via the thin film layer. The diffractive optical element includes a plurality of annular areas each including annuli arrayed in a radial direction, and array pitches of the annuli of each annular area are different from each other. The following inequalities are satisfied:

$$0.4 < |N1-N2| \times P < 6.0$$

$$0 \le |N1+N2-2\times Nf| \times df < 40$$

where P (μm) is a minimum value of the array pitches, N1 and N2 are refractive indices for a design wavelength of the first diffraction grating and the second diffraction grating in at least one of the plurality of annular areas, respectively, Nf is a refractive index for the design wavelength of the thin film layer on the grating slopes, and df (nm) is a maximum value of a thickness of the thin film layer on the grating slopes. An optical system, an image pickup apparatus, a display apparatus each having the above diffractive optical element also constitute another aspect of the embodiment.

Further features of the disclosure will become apparent from the following description of embodiments with reference to the attached drawings.

DESCRIPTION OF THE EMBODIMENTS

Referring now to the accompanying drawings, a detailed description will be given of embodiments according to the disclosure.

EXAMPLE 1

Figure 1A:
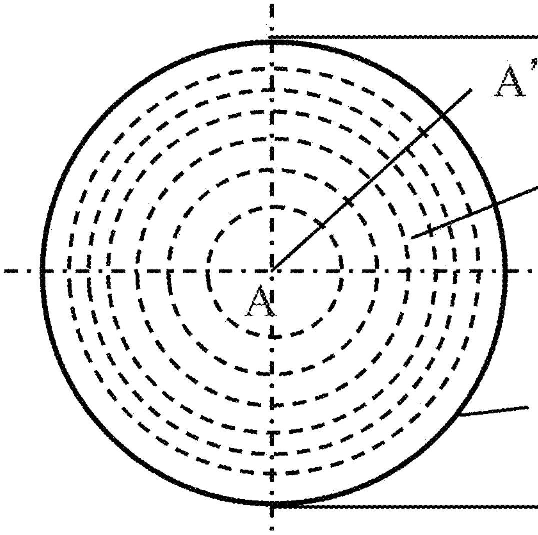
FIGS. 1A and 1B are a front view and a side view of a DOE according to any one of Examples 1 to 5.
Figure 1B:
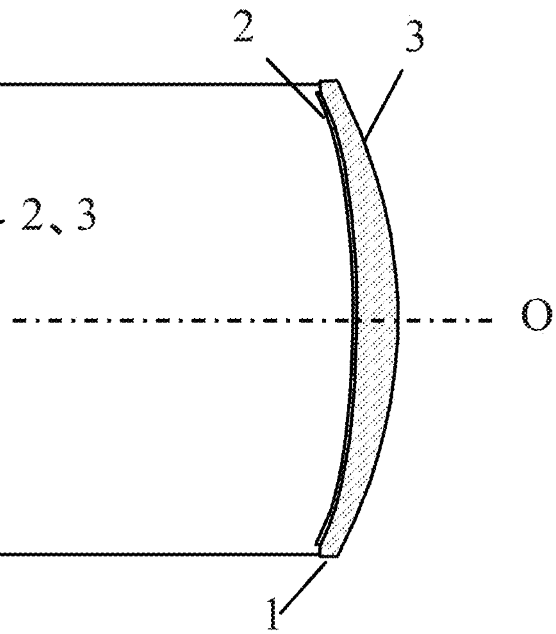
Figure 2:
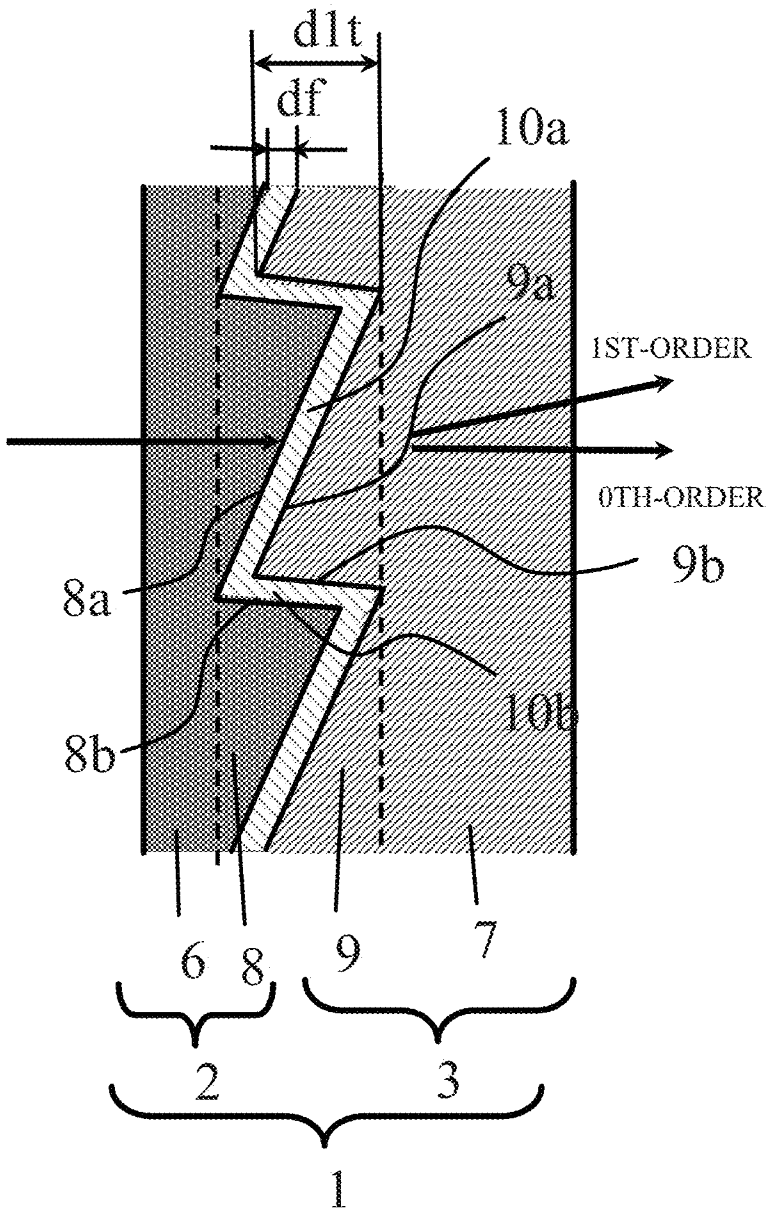
FIG. 2 is a partial sectional view of the DOE according to Example 1.

Referring now to FIGS. 1A, 1B, and 2, a description will be given of an diffractive optical element (DOE) 1 according to Example 1. FIG. 1A is a front view of the DOE 1. FIG. 1B is a side view of the DOE 1. FIG. 2 is a partial sectional view of the DOE 1 taken along a line A-A' in FIG. 1A. FIG. 2 is a diagram deformed in the grating depth direction.

The DOE 1 includes a second element portion 3 having a sufficient thickness and optical (refractive) power on an optical axis O, a first element portion 2 having a thin thickness in close contact with each other, and a diffraction grating formed between the first element portion 2 and the second element portion 3. The DOE 1 includes a first diffraction grating 8 made of a first material, a second diffraction grating 9 made of a second material different from the first material, and dielectric thin films (thin film layers) 10*a* and 10*b*. The first diffraction grating 8 and the second diffraction grating 9 are layered in close contact with each other via the dielectric thin films 10*a* and 10*b*.

As illustrated in FIG. 2, the first element portion 2 includes a first grating forming layer including a grating base portion 6 and the first diffraction grating 8 integrated with the grating base portion 6. Similarly to the first element portion 2, the second element portion 3 includes a second grating forming layer including a grating base portion 7 and the second diffraction grating 9 integrated with the grating base portion 7. The first diffraction grating 8 and the second diffraction grating 9 are layered in close contact with each other via the dielectric thin film 10*a* between grating slopes 8*a* of the first diffraction grating 8 and grating slopes 9*a* of the second diffraction grating 9, and the dielectric thin film 10*b* between the grating wall surfaces 8*b* of the first diffraction grating 8 and the grating wall surfaces 9*b* of the second diffraction grating 9. In this example, the first element portion 2 and the second element portion collectively act as one DOE 1.

The first diffraction grating 8 and the second diffraction grating 9 each have a concentric grating shape and a lens effect because the grating pitch changes in the radial direction. That is, the DOE 1 has a plurality of annular areas with different grating pitches in the radial direction. In other words, the DOE 1 includes a plurality of annular areas each including annuli arrayed in a radial direction, and array pitches of the annuli of each annular area are different from each other. In this example, the wavelength region of light incident on the DOE 1, that is, the use wavelength region is the visible region, and the materials and grating thicknesses of the first diffraction grating 8 and the second diffraction grating 9 are selected throughout the visible region so as to increase the diffraction efficiency of the first-order diffracted light.

A description will now be given of the specific configuration of the DOE 1. In the DOE 1 according to this example, the first material of the first diffraction grating 8 is an episulfide resin (Nd=1.6630, N55=1.6668, νd=36.8, θgF=0.583). The second material of the second diffraction grating 9 is a polycarbonate thermoplastic resin (Nd=1.5880, N55=1.5924, νd=28.3, θgF=0.619). The dielectric thin films 10*a* and 10*b* are thin films of inorganic oxide of $SiO_2$ (Nd=1.468, N55=1.470). The dielectric thin film 10*a* on the grating slopes has a thickness of 40 nm, and the dielectric thin film 10*b* on the grating wall surfaces has a thickness of 10 nm.

In this example, the Abbe number νd based on the d-line and the partial dispersion ratio θgF are defined in the generally used manner. The Abbe number νd and the partial dispersion ratio θgF are expressed by the following equations (a) and (b):

$$\nu d=(Nd-1)/(NF-NC) \tag{a}$$

$$\theta gF=(Ng-NF)/(NF-NC) \tag{b}$$

where Nd, NF, NC, and Ng are refractive indices for the d-line (587.6 nm), the F-line (486.1 nm), the C-line (656.3 nm), and the g-line (435.8 nm) in the Fraunhofer line, respectively.

N55 is a refractive index for a wavelength of 550 nm. The thickness of the second element portion (lens portion) 3 on the optical axis O is 3.5 mm, the outer diameter is 40 mm, the central radius of curvature at the interface with the first element portion (lens portion) is −115.1 mm, and the central radius of curvature of the lens surface facing the air is −40.1 mm. The thickness of the first element portion (lens portion) 2 on the optical axis O is 0.15 mm, the outer diameter is 38 mm, the central radius of curvature at the interface with the second element portion (lens portion) and the central radius of curvature of the lens surface facing the air are both −115.1 mm.

An array (diffraction) pitch P of the DOE 1 is 45.6 to 1120 μm, a diffraction surface at the center of the optical axis has positive refractive power, and a focal length is 1070 mm. A grating height d1 of the second diffraction grating 9 is 7.36 to 7.46 μm. Where θt is an angle formed between a surface normal of an enveloping surface and the grating wall surface at a position where an arbitrary grating wall surface touches the enveloping surface connecting the tops of the second diffraction grating 9, the DOE 1 according to this example has the wall angle θt of 4.0 to 8.9 degrees.

Figure 3:
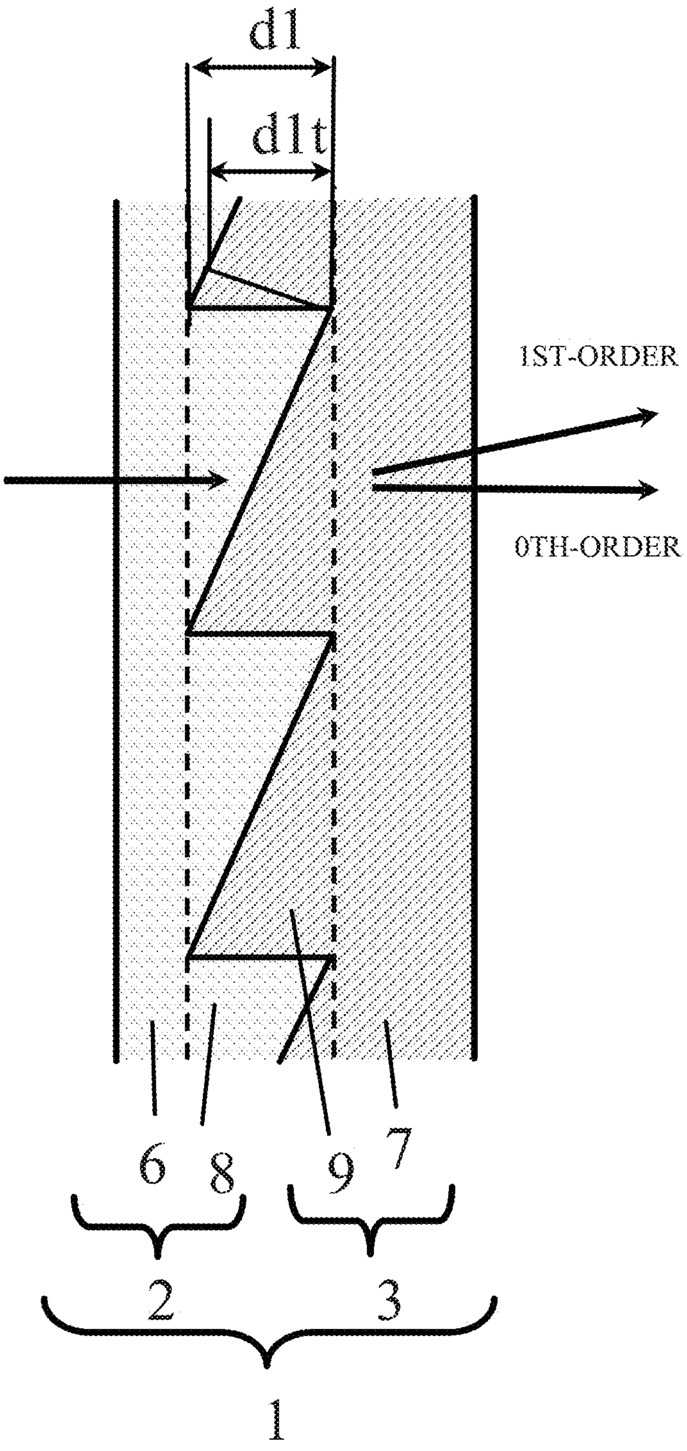
FIG. 3 explains a relationship between a phase difference and diffraction efficiency of the DOE according to Example 1.

Referring now to FIG. 3, a description will be given of a relationship between a phase difference and diffraction efficiency of the DOE 1 according to this example. FIG. 3 explains the relationship between the phase difference and the diffraction efficiency of the DOE 1, and schematically illustrates the DOE 1 in which the thicknesses of the dielectric thin films 10*a* and 10*b* is eliminated, and the angle between the grating wall surfaces and the enveloping surface connecting the grating vertices is a right angle.

In the DOE 1, the condition that maximizes the diffraction efficiency of diffracted light of diffraction order m is that the optical path length difference Φ(λ) satisfies the following equation (c) at a wavelength λ.

$$\Phi(\lambda)=-(n02-n01)\times d1=m\lambda \tag{c}$$

where n02 is a refractive index of the material of the second diffraction grating 9 for the light at the wavelength λ, n01 is a refractive index of the material of the first diffraction grating 8 for the light at the wavelength λ, and d1 is a grating height (grating thickness) of the first diffraction grating 8 and the second diffraction grating 9.

In FIG. 3, assume that the diffraction order of light diffracted downward from the 0th-order diffracted light is a negative diffraction order, and the diffraction order of light diffracted upward from the 0th-order diffracted light is a positive diffraction order. In that case, in the case of a diffraction grating having a grating shape in which the grating thickness of the first diffraction grating 8 on the incident side increases from the bottom to the top in FIG. 3, the sign of the grating height d1 in equation (c) is positive.

The diffraction efficiency η(λ) at an arbitrary wavelength λ is expressed by the following equation (d):

$$\eta(\lambda)=sinc^2[\pi\{m-\Phi(\lambda)/\lambda\}] \tag{d}$$

In equation (d), m is the order of the diffracted light to be evaluated, and Φ(λ) is an optical path length difference in one unit cell of the DOE for the light of wavelength λ. sinc(x) is a function expressed by {sin(x)/x}. The design wavelength λd of the DOE 1 according to this example is 587.56 nm. This is similarly applied to the following examples. A design wavelength has a value near the average value of the use wavelengths of the DOE, and more specifically, the following equation (1) is established:

$$0.9<\lambda d/\lambda ave<1.1 \tag{1}$$

where λave (nm) is the average value of the use wavelengths.

The DOE 1 according to this example is used in the visible range, the wavelength used is 400 nm to 700 nm, and λave is 550 nm. In the DOE 1 illustrated in FIG. 3, the diffraction efficiency is highest in the visible wavelength range in the case of the grating height d1=7.36 μm.

The grating wall surface 8*b* of the first diffraction grating 8 does not need to be perpendicular to the enveloping line connecting the vertex portions of the first diffraction grating 8, and can be angled according to the incident angle of the light ray. As illustrated in FIG. 2, in the diffraction grating in which the grating wall surface 8*b* is angled to the enveloping line connecting the vertex portions of the first diffraction grating 8, d1t is a distance between the enveloping line connecting the vertex portions of the first diffraction grating 8 and the grating vertex.

In this example, the first diffraction grating 8 and the second diffraction grating 9 are made of different materials. For example, the second diffraction grating 9 is made of a low-refractive-index high-dispersion material, and the first diffraction grating 8 is made of a high-refractive-index low-dispersion material that has a higher refractive index. The following inequality (2) may be satisfied to acquire high diffraction efficiency:

$$1.0<(N1-N2)/(1/\nu 2-1/\nu 1)<20.0 \tag{2}$$

where N1 and N2 are refractive indices of the materials of the first diffraction grating 8 and the second diffraction grating 9 for the d-line, respectively, and ν1 and ν2 are Abbe numbers of the material of the first diffraction grating 8 and the second diffraction grating 9 based on the d-line.

Inequality (2) may be replaced with inequality (2a) below:

$$1.2<(N1-N2)/(1/\nu 2-1/\nu 1)<18.0 \tag{2a}$$

Inequality (2) may be replaced with inequality (2b) below:

$$1.5<(N1-N2)/(1/\nu 2-1/\nu 1)<15.0 \tag{2b}$$

A description will now be given of a relationship between the minimum value P of the array pitch and the refractive index of each material, and the meaning of having the thin film layer in the DOE 1 according to this example. In the DOE 1 according to this example, the minimum value P of the array pitch may be 80 μm or less. For example, the size of the observation optical system is to be reduced due to space constraints and thus needs to correct various aberrations with a small number of lenses. In that case, a compact optical system can be realized by increasing the refractive power of the DOE 1 to correct chromatic aberration. In the peripheral portion of the DOE 1, there may be a configuration in which the minimum value P of the array pitch is smaller than 100 μm. As the minimum value P of the array pitch becomes narrower and the ratio of the grating height to the minimum value P becomes higher, the influence of wavefront disturbance at the wall surface portion increases, and the deterioration of the diffraction efficiency becomes remarkable.

The grating height d (μm) and the minimum value P (μm) of the array pitch may satisfy the following inequality (3).

$$0.10<d/P<1.50 \tag{3}$$

Inequality (3) may be replaced with inequality (3a) below:

$$0.11<d/P<1.3 \tag{3a}$$

Inequality (3) may be replaced with inequality (3b) below:

$$0.12<d/P<1 \tag{3b}$$

In using the DOE 1 in the visible range as in this example, the design wavelength λ is often set near the d-line (587.56 nm). Due to equation (c) and inequality (3), the following inequality (4) may be satisfied:

$$0.4<|N1-N2|\times P<6.0 \tag{4}$$

where N1 is a refractive index of the first diffraction grating 8 at the design wavelength λ, and N2 is a refractive index of the second diffraction grating 9 at the design wavelength λ.

In a case where the value becomes lower than the lower limit of inequality (4), the ratio of the grating height to the minimum value of the array pitch becomes higher, and the deterioration of the diffraction efficiency becomes significant. On the other hand, in a case where the value becomes higher than the upper limit of inequality (4), the minimum value of the array pitch becomes larger and the desired chromatic aberration correction effect cannot be acquired, or the grating height becomes lower and the selection of the grating material becomes difficult.

Inequality (4) may be replaced with inequality (4a) below:

$$0.5<|N1-N2|\times P<5.0 \tag{4a}$$

Inequality (4) may be replaced with inequality (4b) below:

$$0.6<|N1-N2|\times P<4.5 \tag{4b}$$

The minimum value of the array pitch P (μm) may satisfy the following inequality (5):

$$10<P<80 \tag{5}$$

In a case where the value becomes lower than the lower limit of inequality (5), the diffraction efficiency deteriorates due to an increase in the grating height unless the difference between the refractive index of the first diffraction grating 8 and the refractive index of the second diffraction grating 9 is increased. On the other hand, in a case where the value becomes higher than the upper limit of inequality (5), a sufficient chromatic aberration correction effect of the optical system cannot be acquired.

Inequality (5) may be replaced with inequality (5a) below:

$$12<P<75 \tag{5a}$$

Inequality (5) may be replaced with inequality (5b) below:

$$15<P<70 \tag{5b}$$

The DOE 1 according to this example is intended to have a configuration that can be manufactured at low cost. Therefore, the second element portion 3 having the second diffraction grating 9 with a large thickness may be formed by integral molding using a mold. More specifically, in a case where the second element portion 3 is formed by the injection mold using a thermoplastic material as the material forming the second diffraction grating 9, the second diffraction grating 9 and the second element can be acquired in highly accurate lens shapes.

After the second element portion 3 having the diffraction surfaces (grating slopes 9*a*) is formed, another resin material is applied onto the diffraction surfaces (grating slopes 9*a*) and cured, and thereby the DOE 1 in which the first element portion 2 is closely layered can be acquired. At this time, by using an ultraviolet curable resin or the like as the first material of the first diffraction grating 8, it becomes easier to obtain a DOE having a desired cured grating shape. However, as explained in inequalities (3) and (4), in order to reduce the grating height d of each diffraction grating, it is necessary to increase the refractive index difference |N1−N2| between the two materials. As explained for inequality (2), materials for the two grating materials may have different dispersions to some extent.

In order to satisfy the combination of materials that satisfies the above conditions, for example, a polycarbonate resin or polyester resin for the injection molding material of the second diffraction grating 9 is a resin with a low refractive index and high dispersion. An ene-thiol resin material or an episulfide resin material as the ultraviolet curing resin of the first diffraction grating 8 is a resin with a high refractive index and low dispersion, and thus high diffraction efficiency can be obtained.

However, the researchers' studies have revealed that an ultraviolet curable resin applied onto a diffraction grating made of a polycarbonate resin or polyester resin can cause organic substance migration between the resins in some resin combinations and resin molten penetration. In particular, coating an episulfide material with a higher refractive index causes a large amount of molten penetration with the diffraction grating made of a polycarbonate resin or polyester resin.

Accordingly, the DOE 1 according to this example includes thin film layers (dielectric thin films 10*a* and 10*b*) between the second diffraction grating 9 made of a thermoplastic resin material and the first diffraction grating 8 made of a UV curable resin material. However, unless the refractive index and film thickness of the thin film layer between two diffraction gratings are properly set, light reflected at the interface remarkably increases, ghost light and flare light deteriorate the image quality. Accordingly, the DOE 1 according to each example satisfies the following inequality (6):

$$0\leq|N1+N2-2\times Nf|\times df<40 \tag{6}$$

where Nf is a refractive index (average refractive index) of the thin film 10*a* on the grating slopes for the design wavelength in at least one of the plurality of annular areas, and df is a maximum thickness (maximum total thickness, maximum film thickness) (nm) of the thin film 10*a* on the grating slopes. In inequality (6), |N1+N2−2×Nf| means a difference between the average value of the refractive index of the first diffraction grating 8 and the refractive index of the second diffraction grating 9, and the average refractive index of the thin film layer. Bringing the value of |N1+N2−2×Nf| close to 0 can suppress the reflected light amount on the grating surface. In a case where the value becomes higher than the upper limit of inequality (6), the reflectance increases due to an increase in film thickness and an increase in the refractive index difference between the thin film layer and the grating material, or problems such as peeling-off due to environmental resistance are likely to occur.

Inequality (6) may be replaced with inequality (6a) below:

$$1<|N1+N2-2\times Nf|\times df<35 \tag{6a}$$

In a case where the value becomes lower than the lower limit of inequality (6a), the film thickness becomes thinner, it becomes difficult to suppress molten penetration of the resin and to control the refractive indices of the grating material and thin film material, and the cost increases.

Inequality (6) may be replaced with inequality (6b) below:

$$3<|N1+N2-2\times Nf|\times df<30 \tag{6b}$$

The thin film layer made of a material containing an inorganic material can satisfactorily suppress migration of organic components between the first diffraction grating 8 and the second diffraction grating 9. For example, aluminum oxide ($Al_2O_3$), silicon oxide ($SiO_2$, SiO), titanium oxide (TiOx), tantalum oxide (TaOx), niobium oxide (NbOx), chromium (Cr), etc. are suitable. The thin film layer does not have to be a layer of a single material, and may include multiple layers including at least one layer containing an inorganic material. Examples of methods for forming the thin film layer include vacuum evaporation and sputter evaporation, but spin coating can also be used.

In each example, the following inequality (7) may be satisfied.

$$0.001<|N1+N2-2\times Nf|<0.600 \tag{7}$$

In a case where the value becomes lower than the lower limit of inequality (7), it becomes difficult to select the material and result in an expensive configuration. On the other hand, in a case where the value becomes higher than the upper limit of inequality (7), the reflectance at the grating interface increases.

Inequality (7) may be replaced with inequality (7a) below:

$$0.005 < |N1 + N2 - 2 \times Nf| < 0.500 \quad (7a)$$

Inequality (7) may be replaced with inequality (7b) below:

$$0.010 < |N1 + N2 - 2 \times Nf| < 0.400 \quad (7b)$$

In each example, the maximum thickness df (nm) of the thin film layer may satisfy the following inequality (8):

$$3 < df < 200 \quad (8)$$

In a case where the value becomes lower than the lower limit of inequality (8), it becomes difficult to suppress molten penetration between resins. On the other hand, in a case where the value becomes higher than the upper limit of inequality (8), the film stress increases after the thin film layer is formed, and peel-off and surface deformation between the film and resin increase.

Inequality (8) may be replaced with inequality (8a) below:

$$5 < df < 100 \quad (8a)$$

Inequality (8) may be replaced with inequality (8b) below:

$$10 < df < 90 \quad (8b)$$

Figure 4A:
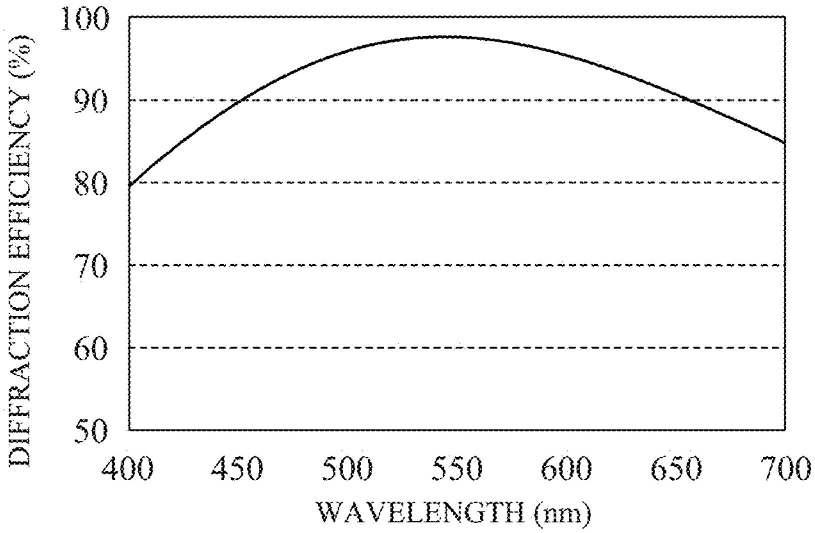
FIGS. 4A and 4B illustrate a relationship between diffraction efficiency and wavelength and a relationship between reflectance and wavelength in Example 1, respectively.
Figure 4B:
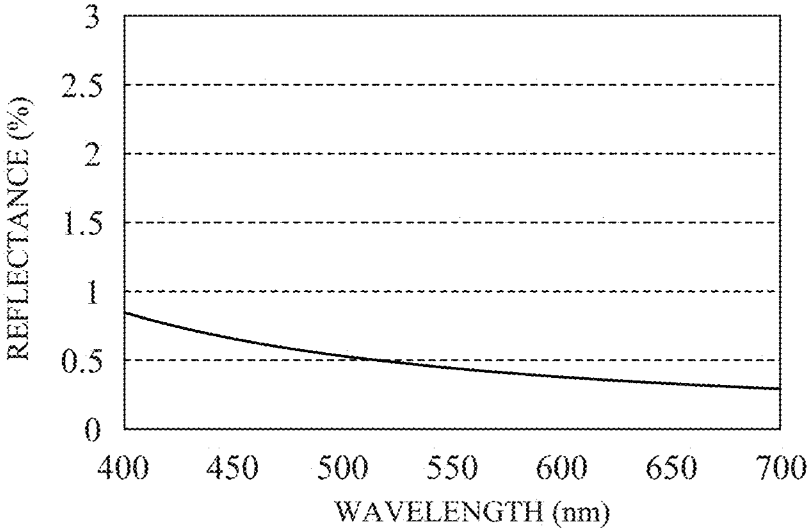

FIG. 4A illustrates the diffraction efficiency of the DOE 1 according to this example in which the minimum value of the array pitch P is 45.6 μm and the grating height d1 is 7.46 μm. In FIG. 4A, a horizontal axis represents a wavelength (nm), and a vertical axis represents the diffraction efficiency (%). FIG. 4B illustrates the reflectance at the grating interface of the DOE 1 according to this example. In FIG. 4B, a horizontal axis represents the wavelength (nm), and a vertical axis represents the reflectance (%).

The diffraction efficiency illustrated in FIG. 4A has a value calculated using rigorous coupled wave analysis (referred to as RCWA hereinafter) among rigorous wave calculations. As illustrated in FIG. 4A, the thin film layer disposed at the grating interface improves the selectivity of the grating material. The configuration that satisfies inequality (4) can achieve high diffraction efficiency of more than 80% in a wide wavelength range from 430 nm to 670 nm in the visible range, despite the narrow pitch configuration with the minimum value of the array pitch P=45.6 μm.

As illustrated in FIG. 4B, properly setting the refractive index of each of the thin film layer, the first diffraction grating 8, and the second diffraction grating 9 and the thickness of the thin film layer can provide the DOE 1 with low reflectance of 1% or less in the wide wavelength range of the visible range from 430 nm to 670 nm.

As described above, the DOE 1 according to this example has a structure in which the thin film layer is provided between the grating planes of the first diffraction grating 8 and the second diffraction grating 9. This structure suppresses the molten penetration of the resin material and facilitates the selection of the grating material, and a combination of materials cannot be realized, and thus high diffraction efficiency can be acquired. Using the thermoplastic resin material for the second diffraction grating 9 and integrally molding the diffraction grating surface can provide the less expensive DOE 1.

In this example, as described above, after the second element portion 3 having the second diffraction grating 9 is integrally formed by the injection molding using the thermoplastic material, the first diffraction grating 8 is formed using the ultraviolet curable resin. In this case, surface shape deformation can be suppressed when the first diffraction grating 8 is molded by increasing the thickness on the optical axis of the lens of the second element portion 3 made of the injection molding material to some extent.

In a case where the thickness on the optical axis of the lens of the first element portion 2 having the first diffraction grating 8 is too thin, the shape of the diffraction grating may be transferred to the surface during curing, and the diffraction efficiency deteriorates. On the other hand, in a case where the thickness of the lens is too thick, the change in surface shape during curing becomes large and aberrations increase.

The following inequality (9) may be satisfied:

$$5 < L2/L1 < 200 \quad (9)$$

where L1 is a thickness on the optical axis of the lens (first lens) made of the same material as that of the first diffraction grating 8, and L2 is a thickness on the optical axis of the lens (second lens) made of the same material as that of the second diffraction grating 9.

Inequality (9) may be replaced with inequality (9a) below:

$$7 < L2/L1 < 150 \quad (9a)$$

Inequality (9) may be replaced with inequality (9b) below:

$$10 < L2/L1 < 100 \quad (9b)$$

As described above, in the DOE 1 according to this example, the second diffraction grating 9 made of an injection molding material is made of a low-refractive-index high-dispersion material. High diffraction efficiency can be theoretically obtained by selecting a high-refractive-index low-dispersion material as the material of the second diffraction grating 9 and a low-refractive-index high-dispersion material as the material of the first diffraction grating 8. However, there are few options for high-refractive-index low-dispersion injection molding materials, and there are also few options for low-refractive-index high-dispersion resins as ultraviolet curable resins, and thus the cost increases.

Therefore, the refractive index N2 of the second diffraction grating 9 made of the injection molding material may be lower than the refractive index N1 of the first diffraction grating 8 made of the ultraviolet curing resin. The following inequality (10) may be satisfied:

$$0.02 < N1 - N2 < 0.15 \quad (10)$$

In a case where the value becomes lower than the lower limit of inequality (10), the grating height increases and the diffraction efficiency decreases. On the other hand, in a case where the value becomes higher than the upper limit of inequality (10), it becomes necessary to significantly separate the dispersion between the two materials, it becomes difficult to select materials and the cost increases, or it becomes difficult to obtain high diffraction efficiency throughout the visible range.

Inequality (10) may be replaced with inequality (10a) below:

$$0.02 < N1 - N2 < 0.13 \quad (10a)$$

Inequality (10) may be replaced with inequality (10b) below:

$$0.03 < N1 - N2 < 0.10 \quad (10b)$$

In the DOE 1 according to this example, the thin film layer may be formed at the grating interface by forming the thin film layer on both the grating slopes and the grating wall surfaces because the molten penetration can be suppressed between the two grating resins. However, in a case where increasing the thickness of the thin film layer on the wall surfaces reduces the ratio of the slope portion as an effective surface in the DOE 1 having an area with a narrow array (diffraction) pitch as in this example, the diffraction efficiency deteriorates. Therefore, the thin film layer on the grating wall surfaces may be thinner than the thin film layer on the grating slopes.

In a case where the thin film layer is formed, for example, by the vapor deposition, the grating wall surface of the second diffraction grating 9 may be angled to some extent relative to the optical axis of the lens of the first element portion 2. If the angle of the wall surface approaches parallel to the optical axis, no film is formed on the wall surface during the vapor deposition, and molten penetration occurs between the two resins on the wall surface.

More specifically, the following inequality (11) may be satisfied within the effective area:

$$2 < Ah < 50 \quad (11)$$

where Ah (deg) is an angle formed between the wall surface portion (each grating wall surface) of the second diffraction grating 9 and the optical axis of the lens (first element portion 2) made of the same material as the first material of the first diffraction grating 8. The effective area is an area (effective diameter) on an optical surface through which effective rays contributing to imaging passes.

Inequality (11) may be replaced with inequality (11a) below:

$$2 < Ah < 40 \quad (11a)$$

Inequality (11) may be replaced with inequality (11b) below:

$$3 < Ah < 30 \quad (11b)$$

EXAMPLE 2

A description will now be given of Example 2. The dielectric thin film (thin film layer) 10*a* on the grating slope has a uniform thickness in the DOE according to Example 1, whereas the dielectric thin film has a non-uniform thickness in this example.

In the DOE according to this example, the thin film layer contains an inorganic material, and as described above, and is formed on the grating surface of the second diffraction grating 9 made of the injection molding material by various vapor deposition methods, spin coating methods, etc. Ideally, the thin film may have the same shape as the grating surface 9*a* of the second diffraction grating 9 and a uniform thickness in the radial direction from the viewpoint of diffraction efficiency. However, in order to form a film with a uniform thickness, the film thickness distribution must be controlled with high accuracy by performing planetary rotation deposition or mask deposition. Even the spin coating method needs surface treatment on the second diffraction grating 9 as the base material and strict control of the viscosity of the film material, so that either method increases the manufacturing cost. Accordingly, in order to obtain high-performance diffraction efficiency even with a low-cost manufacturing method, the DOE according to this example is less likely to deteriorate diffraction efficiency even if the thin film 10*a* has a thickness that changes at or near the valley portion on the grating slope 8*a* of the first diffraction grating 8. The DOE according to this example has the configuration illustrated in FIG. 1, and the lens shapes and materials of the first element portion 2 and the second element portion 3 are the same as those of Example 1.

Figure 5:
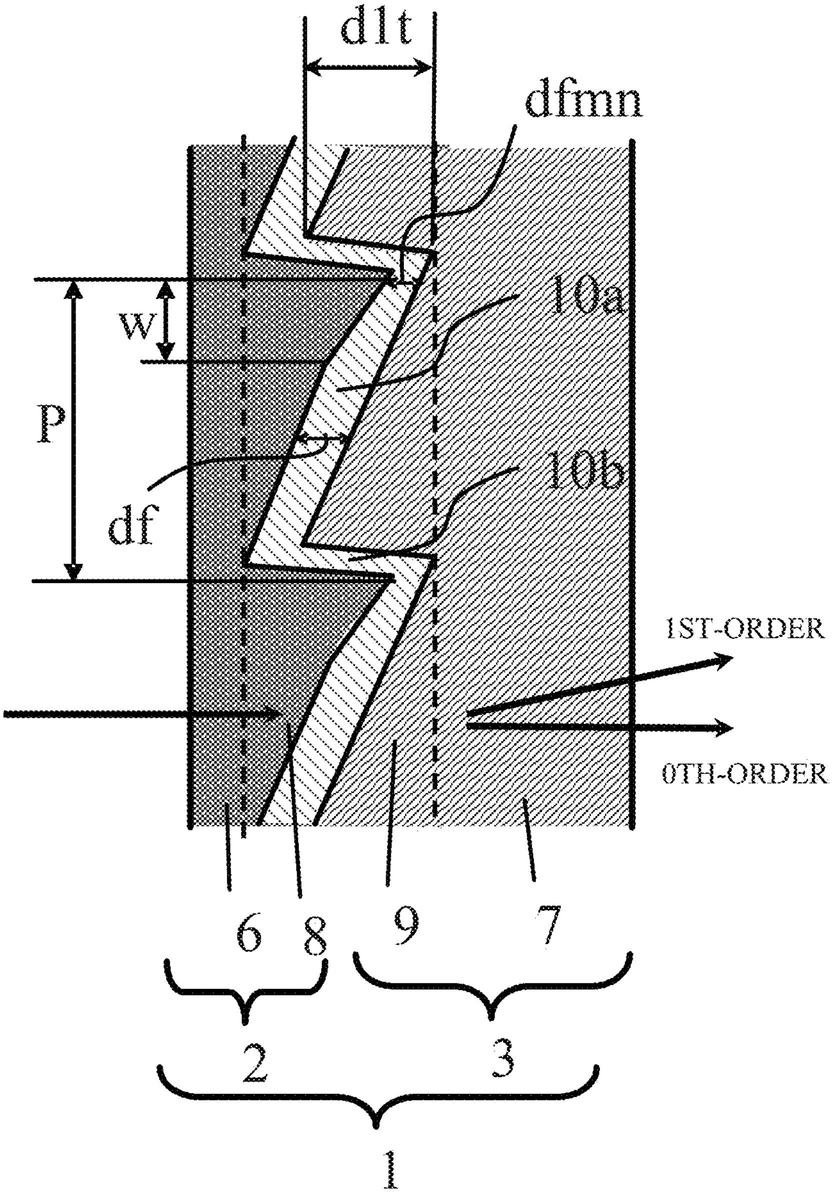
FIG. 5 is a partial sectional view of the DOE according to any one of Examples 2 to 5.

FIG. 5 is a sectional view of the DOE 1 according to this example taken along a line A-A' in FIG. 1. FIG. 5 is a diagram deformed in the grating depth direction. As illustrated in FIG. 5, the dielectric thin films (thin film layers) 10*a* and 10*b* are formed at the interface between the first diffraction grating 8 and the second diffraction grating 9 similarly to Example 1, but the thickness of the thin film 10*a* on the grating slope is changed near the valley portion of the second diffraction grating 9.

This example provides a diffraction grating that achieves both manufacture easiness and high diffraction efficiency by properly controlling a film thickness changing amount. More specifically, the reference thickness df at the grating slope of the thin film layer is 40 nm, and the thickness of the thin film 10*a* gradually decreases in an area with a width w of 4 μm from the valley portion of the second diffraction grating 9 toward the valley portion of the second diffraction grating 9. In other words, the thin film layer includes a portion where its thickness changes at valley portions on the grating slopes. The minimum thickness (minimum film thickness) dfmn of the thin film 10*a* at the valley portion of the second diffraction grating 9 is 20 nm.

The following inequality (12) may be satisfied:

$$0.10 < dfmn/df < 0.95 \quad (12)$$

where dfmn is a minimum thickness on the grating slope of the thin film layer, and df is a maximum film thickness (maximum total film thickness).

In a case where the value becomes lower than the lower limit of inequality (12), the phase difference in the pitch direction due to the change in the thickness of the thin film layer cannot be ignored, and the diffraction efficiency deteriorates. On the other hand, in a case where the value becomes higher than the upper limit of inequality (12), the structure becomes expensive.

Inequality (12) may be replaced with inequality (12a) below:

$$0.15 < dfmn/df < 0.93 \quad (12a)$$

Inequality (12) may be replaced with inequality (12a) below:

$$0.20 < dfmn/df < 0.90 \quad (12b)$$

In a case where the thickness of the thin film layer changes, the following inequality (13) may be satisfied:

$$0.2 < |dfs \times (N1 + N2 - 2 \times Nf)| < 30.0 \quad (13)$$

where dfs is a difference between a minimum thickness (minimum film thickness) dfmn and a maximum thickness (maximum film thickness) df of the thin film 10*a* on the grating slopes. Thereby, deterioration in diffraction efficiency due to the uneven film thickness can be minimized.

Inequality (13) may be replaced with inequality (13a) below:

$$0.5 < |dfs \times (N1 + N2 - 2 \times Nf)| < 20.0 \quad (13a)$$

Inequality (13) may be replaced with inequality (13b) below:

$$1.0 < |dfs \times (N1 + N2 - 2 \times Nf)| < 15.0 \quad (13b)$$

The following inequality (14) may be satisfied in an annulus in which the minimum value P (μm) of the array pitch is minimum (in an annular area having a minimum array pitch):

$$0.002 < w/(P \times d) < 0.100 \quad (14)$$

where w (μm) is a width in the pitch direction where the film thickness changes on the grating slope of the thin film layer, and d (μm) is a grating height.

In a case where the value becomes higher than the upper limit of inequality (14), deterioration of diffraction efficiency due to uneven thickness of the thin film layer increases. On the other hand, in a case where the value becomes lower than the lower limit of inequality (14), it becomes necessary to use an expensive manufacturing method to suppress changes in film thickness.

Inequality (14) may be replaced with inequality (14a) below:

$$0.003 < w/(P \times d) < 0.090 \quad (14a)$$

Inequality (14) may be replaced with inequality (14b) below:

$$0.005 < w/(P \times d) < 0.080 \quad (14b)$$

Figure 6:
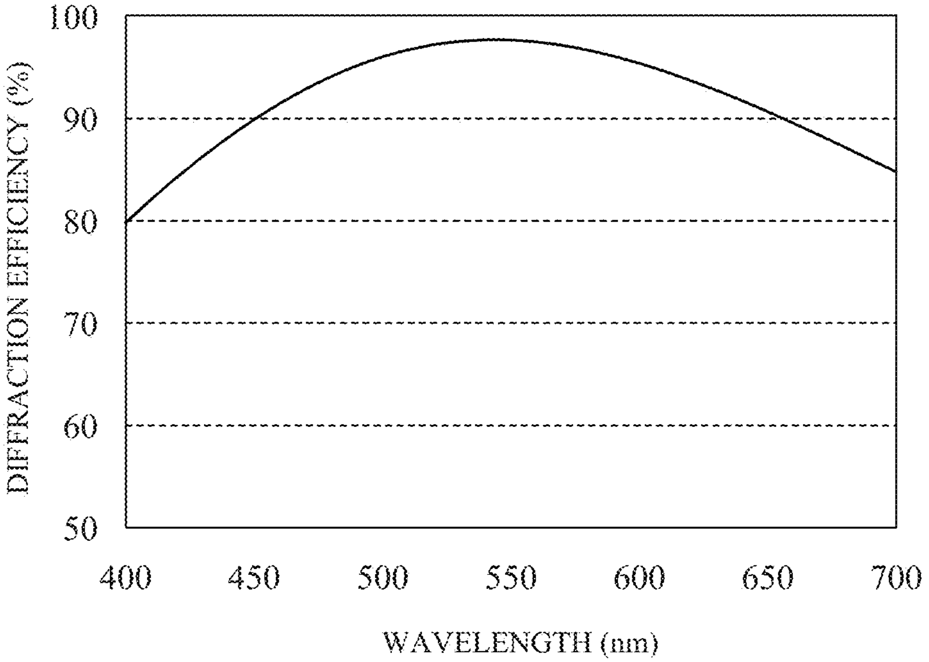
FIG. 6 illustrates a relationship between diffraction efficiency and wavelength in Example 2.

FIG. 6 illustrates the diffraction efficiency calculated using RCWA in the annulus where the minimum value of the array pitch P=45.6 μm and the grating height d1=7.46 μm in the DOE according to this example. In FIG. 6, a horizontal axis represents wavelength (nm), and a vertical axis represents diffraction efficiency (%). As illustrated in FIG. 6, properly controlling the refractive index relationship between the of the thin film layer and the grating material and the shape of the area where the thickness of the thin film layer changes can provide a high diffraction efficiency of over 80% in a wide wavelength region in the visible range of 430 nm to 670 nm. As understood by comparing the diffraction efficiencies in FIGS. 6 and 4A, the configuration that satisfies inequalities (12), (13), and (14) can suppress the diffraction efficiency changes even when the thickness of the thin film layer changes.

EXAMPLE 3

A description will now be given of Example 3. The thin film 10*a* on the grating slope is made of a single material in the DOEs according to Examples 1 and 2, whereas the thin film layer is made of a plurality of materials in the DOE according to this example.

Similarly to Example 2, the DOE according to this example has the configuration illustrated in FIG. 1. In this example, the lens shapes of the first element portion 2 and the second element portion 3 are the same as those of Example 1, but the material of each lens and the grating shape are changed.

FIG. 5 is a sectional view of the DOE according to this example taken along the line A-A' in FIG. 1. FIG. 5 is a diagram deformed in the grating depth direction. As illustrated in FIG. 5, similarly to Example 1, the dielectric thin films (thin film layers) 10*a* and 10*b* are formed at the interface between the first diffraction grating 8 and the second diffraction grating 9. The thickness of the thin film 10*a* on the grating slopes is changed near the valley portions of the second diffraction grating 9. This example provides a diffraction grating that achieves both manufacture easiness and high diffraction efficiency by properly controlling the film thickness changing amount. In the DOE according to this example, the thin film 10*a* on the grating slopes and the thin film 10*b* on the grating wall surfaces each have a three-layer structure using three layers of materials.

In the DOE 1 illustrated in FIG. 5, the first material of the first diffraction grating 8 is an episulfide resin (Nd=1.6630, N55=1.6668, νd=36.8, θgF=0.583). The second material of the second diffraction grating 9 is a polyester thermoplastic resin (Nd=1.6079, N55=1.6126, νd=26.9, θgF=0.624).

Each of the dielectric thin films 10*a* and 10*b* on the grating slopes and the grating wall surfaces has a three-layer structure that includes, in order from the first diffraction grating 8 to the second diffraction grating 9, a thin film layer made of $SiO_2$, a thin film layer made of a mixed material of $Ta_2O_5$ and $TiO_2$, and a thin film made of $SiO_2$. The thicknesses of the dielectric thin film 10*a* on the grating slopes are respectively 26.4 nm, 10 nm, and 25.4 nm from the first diffraction grating 8 to the second diffraction grating 9, and the total film thickness df is 61.8 nm. The refractive index of $SiO_2$ is the same as that of Example 1, and the refractive index of the inorganic oxide thin film layer made of the mixed material of $Ta_2O_5$ and $TiO_2$ is Nd=2.1464 and N55=2.158. The average refractive index of the three thin film layers is Nd=1.5776. The total thickness of the dielectric thin film 10*b* on the grating wall surface portions is 10 nm. The grating height d1 of the second diffraction grating 9 is 10.18 to 10.43 μm. The DOE according to this example has a wall angle θt of 4.0 to 8.9 degrees, which is an angle formed by the surface normal of the enveloping surface connecting the vertex portions of the second diffraction grating 9 and an arbitrary grating wall surface at a position where the arbitrary grating wall surface contacts the enveloping surface.

The thin film layer on the grating slopes has a thickness change around the valley portion of the second diffraction grating 9. More specifically, the reference thickness df of the thin film layer on the grating slope is 61.8 nm. In the area having the width w of 6 μm from the valley portion of the second diffraction grating 9, the thickness of the thin film 10*a* gradually decreases toward the valley portion of the second diffraction grating 9. In other words, the thin film layer includes a portion where its thickness changes at valley portions on the grating slopes. The minimum thickness dfmn of the thin film 10*a* at the valley portion of the second diffraction grating 9 is 18.5 nm.

Figure 7A:
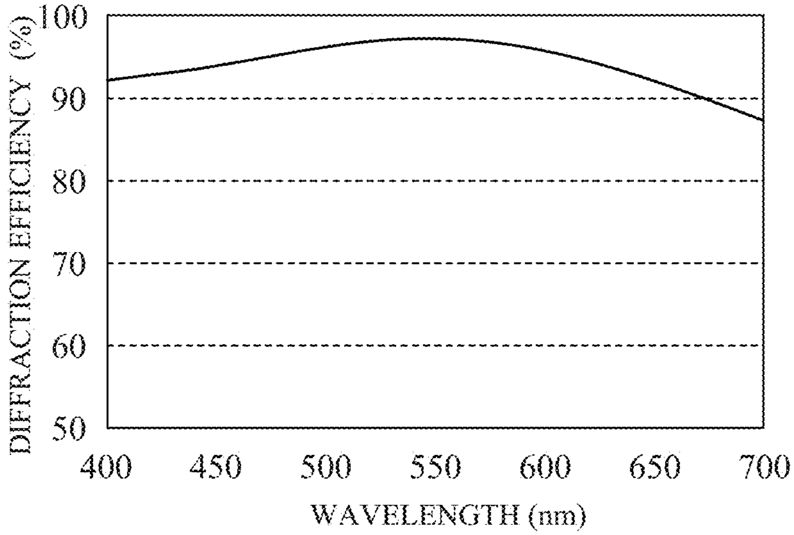
FIGS. 7A and 7B illustrate a relationship between diffraction efficiency and wavelength and a relationship between reflectance and wavelength in Example 3, respectively.
Figure 7B:
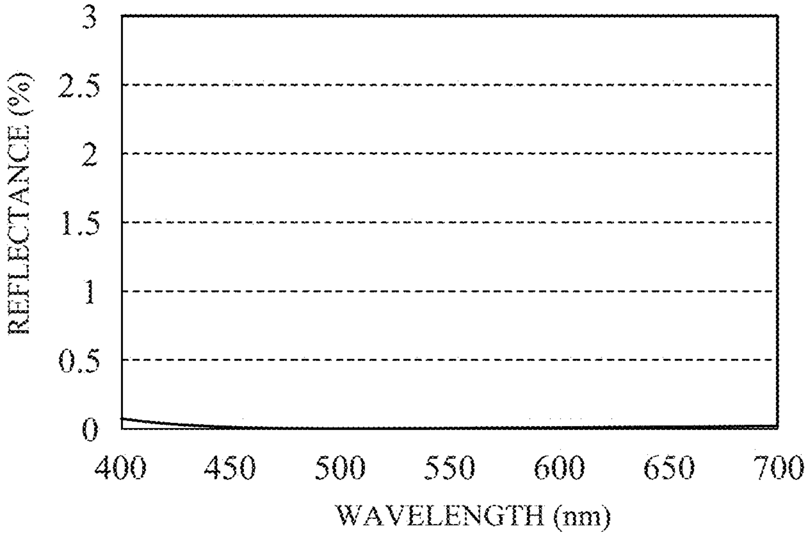

FIG. 7A illustrates the diffraction efficiency calculated using RCWA in the annulus where the minimum value of the array pitch P is 45.6 μm and the grating height d1 is 10.43 μm in the DOE according to this example. In FIG. 7A, a horizontal axis represents wavelength (nm), and a vertical axis represents diffraction efficiency (%). FIG. 7B illustrates the reflectance at the grating interface of the DOE according to this example. In FIG. 7B, a horizontal axis represents wavelength (nm), and a vertical axis represents reflectance (%). As illustrated in FIG. 7A, the thin film layer disposed at the grating interface improves the selectivity of the grating material. In addition, the configuration that satisfies inequality (4) can achieve high diffraction efficiency of more than 90% in a wide wavelength range in the visible range from 430 nm to 670 nm, despite the narrow pitch configuration with the minimum value of the array pitch P of 45.6 μm. As illustrated in FIG. 7B, the refractive indices of the thin film layer, the first diffraction grating 8, and the second diffraction grating 9, and the thickness of the thin film layer are properly set, and the thin film layer has a layered structure. Thereby, the DOE having a low reflectance of 0.1% or less in a wide wavelength range of the visible region from 430 nm to 670 nm can be obtained.

In the DOE according to this example, the thin film layer between the grating surfaces of the first diffraction grating 8 and the second diffraction grating 9 can suppress the molten penetration of the resin material, facilitate the selection of the grating material, and thus realize a combination of materials with high diffraction efficiency. Integral molding of the diffraction grating surface using the thermoplastic resin material for the second diffraction grating 9 can provide a less expensive DOE.

EXAMPLE 4

A description will now be given of Example 4. Similarly to Example 2, the DOE according to this example has the configuration illustrated in FIG. 1, and a modified configuration in which the lens shapes of the first element portion 2 and the second element portion 3, as well as the materials and grating shapes of each lens, have been changed.

FIG. 5 is a sectional view of the DOE according to this example taken along the line A-A' in FIG. 1. FIG. 5 is a diagram deformed in the grating depth direction. As illustrated in FIG. 5, a thin film layer is formed at the interface between the first diffraction grating 8 and the second diffraction grating 9 similarly to Example 1, but the thickness of the dielectric thin film (thin film layer) 10*a* on the grating slopes is changed near the valley portions of the grating slopes 9*a* of the second diffraction grating 9. This example provides a diffraction grating that achieves both manufacture easiness and high diffraction efficiency by properly controlling the film thickness changing amount.

In the DOE 1 illustrated in FIG. 5, the first material of the first diffraction grating 8 is an episulfide resin (Nd=1.6630, N55=1.6668, νd=36.8, θgF=0.583). On the other hand, the second material of the second diffraction grating 9 is a polycarbonate thermoplastic resin (Nd=1.6160, N55=1.6210, νd=25.8, θgF=0.623).

The thickness of the second element portion (lens portion) 3 on the optical axis O is 3.5 mm, the outer diameter is 40 mm, and the central radius of curvature at the interface with the first element portion (lens portion) 2 is −133.9 mm. The central radius of curvature of the lens surface facing the air is −41.5 mm. The thickness on the optical axis O of the first element portion (lens portion) 2 is 0.07 mm, the outer diameter is 37 mm, and both of the central radius of curvature at the interface with the second element portion (lens portion) 3 and the central radius of curvature of the lens surface facing the air are −133.9 mm. The minimum value P of the array pitch of DOE 1 is 19.4 to 820 μm. The diffraction surface at the center of the optical axis has positive refractive power, and the focal length is 571 mm. The grating height d1 of the second diffraction grating 9 is 12.25 to 13.64 μm. The DOE according to this example has a wall angle θt of 4.0 to 16.5 degrees, which is an angle formed by the surface normal of the enveloping surface connecting the vertex portions of the second diffraction grating 9 and an arbitrary grating wall surface at a position where the arbitrary grating wall surface contacts the enveloping surface.

Inorganic oxide $Al_2O_3$ (Nd=1.5888, N55=1.5906) is used for the dielectric thin films 10*a* and 10*b* on the grating slopes and the grating wall surfaces. The maximum thickness of the dielectric thin film 10*a* on the grating slopes is 80 nm, and the maximum thickness (total thickness) of the dielectric thin film 10*b* on the grating wall surfaces is 10 nm. The thickness of the dielectric thin film 10*a* on the grating slope changes around the valley portion of the second diffraction grating 9. More specifically, the reference thickness df of the dielectric thin film 10*a* on the grating slopes is 80 nm, and the thickness of the dielectric thin film 10*a* gradually decreases in the area with the width w of 13 μm from the valley portion of the second diffraction grating 9. In other words, the thin film layer includes a portion where its thickness changes at valley portions on the grating slopes. The minimum thickness dfmn of the dielectric thin film 10*a* at the valley portion of the second diffraction grating 9 is 56 nm.

Figure 8A:
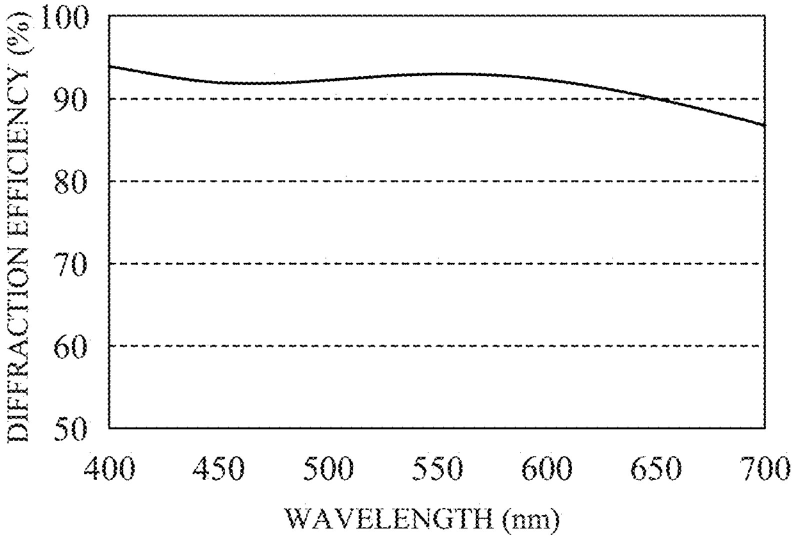
FIGS. 8A and 8B illustrate a relationship between diffraction efficiency and wavelength and a relationship between reflectance and wavelength in Example 4, respectively.
Figure 8B:
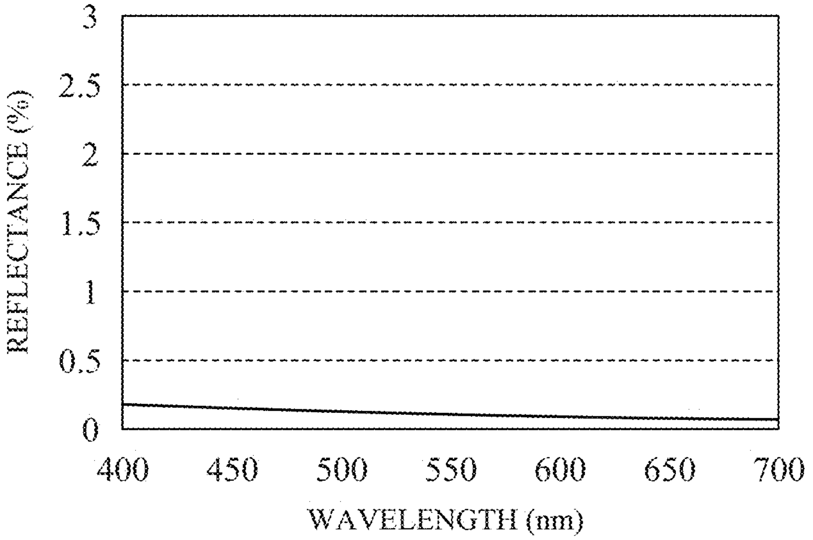

FIG. 8A illustrates the diffraction efficiency calculated using RCWA in the annulus where the minimum value of the array pitch P is 19.4 μm and the grating height d1 is 13.53 μm in the DOE according to this example. In FIG. 8A, a horizontal axis represents wavelength (nm), and a vertical axis represents diffraction efficiency (%). FIG. 8B illustrates the reflectance at the grating interface of the DOE according to this example. In FIG. 8B, a horizontal axis represents wavelength (nm), and a vertical axis represents reflectance (%). As illustrated in FIG. 8A, the thin film layer disposed at the grating interface improves the selectivity of the grating material. The configuration that satisfies inequality (4) can achieve a high diffraction efficiency of more than 85% in a wide wavelength range in the visible range from 430 nm to 670 nm, despite the narrow pitch configuration with the minimum value of the array pitch P of 19.4 μm. As illustrated in FIG. 8B, properly setting the refractive indies of the thin film layer, the first diffraction grating 8, and the second diffraction grating 9, and the thickness of the thin film layer can provide the DOE having a low reflectance of 0.5% or less in the wavelength range of the visible range from 430 nm to 670 nm.

In the DOE according to this example, the thin film layer between the grating surfaces of the first diffraction grating 8 and the second diffraction grating 9 can suppress the molten penetration of the resin material, facilitate the selection of the grating material, and thus realize a combination of materials with high diffraction efficiency. Integral molding of the diffraction grating surface using the thermoplastic resin material for the second diffraction grating 9 can provide a less expensive DOE.

EXAMPLE 5

A description will now be given of Example 5. The DOE according to this example has the configuration illustrated in FIG. 1, similarly to Example 4. The lens shape of the second element portion 3 is the same as that of Example 4, and the thickness on the optical axis of the first element portion 2, the material of each lens, and the grating shape are changed. The thickness on the optical axis of the first element portion 2 is 0.2 mm.

FIG. 5 is a sectional view of the DOE according to this example taken along the line A-A' in FIG. 1. FIG. 5 is a diagram deformed in the grating depth direction. As illustrated in FIG. 5, similarly to Example 1, the dielectric thin films (thin film layers) 10*a* and 10*b* are formed at the interface between the first diffraction grating 8 and the second diffraction grating 9. The thickness of the dielectric thin film 10*a* on the grating slopes is changed near the valley portions of the second diffraction grating 9. This example provides a diffraction grating that achieves both manufacture easiness and high diffraction efficiency by properly controlling the film thickness changing amount.

In the DOE 1 illustrated in FIG. 5, the first material of the first diffraction grating 8 is an episulfide resin (Nd=1.6886, N55=1.6926, $\nu d$=35.9, $\theta gF$=0.584). On the other hand, the second material of the second diffraction grating 9 is a polycarbonate thermoplastic resin (Nd=1.6447, N55=1.6926, $\nu d$=22.5, $\theta gF$=0.635). The dielectric thin films (thin film layers) 10*a* and 10*b* on the grating slopes and the grating wall surfaces are single-layer films made of SiO (Nd=1.521, N55=1.5248) as an inorganic oxide. The maximum thickness of the dielectric thin film 10*a* on the grating slopes is 70 nm, and the maximum thickness (total thickness) of the dielectric thin film 10*b* on the grating wall surfaces is 10 nm. The grating height d1 of the second diffraction grating 9 is 13.72 to 15.63 μm.

The thin film layer on the grating slopes has a thickness change around the valley portions of the second diffraction grating 9. More specifically, the reference thickness df of the thin film layer on the grating slope is 70 nm, and in the area having the width w of 11 μm from the valley portion of the second diffraction grating 9, the thickness of the thin film 10*a* gradually decreases toward the valley portion of the second diffraction grating 9. In other words, the thin film layer includes a portion where its thickness changes at valley portions on the grating slopes. The minimum thickness dfmn of the dielectric thin film 10*a* at the valley portion of the second diffraction grating 9 is 35 nm.

Figure 9A:
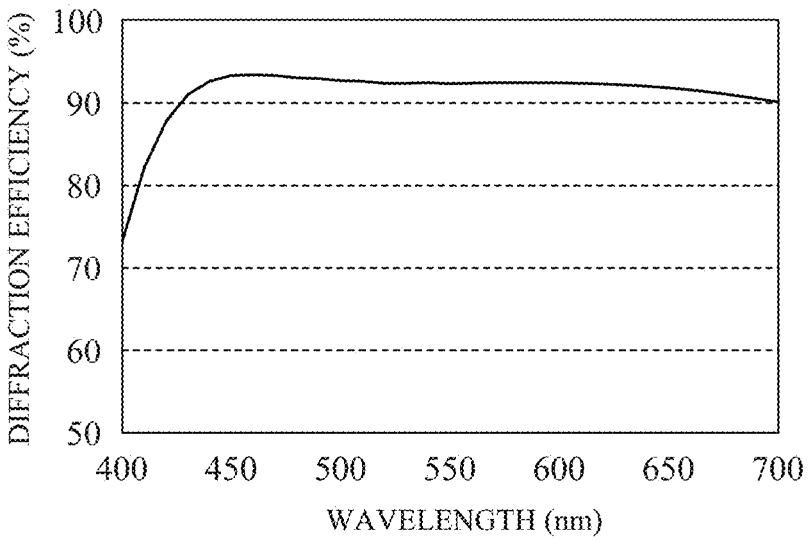
FIGS. 9A and 9B illustrate a relationship between diffraction efficiency and wavelength and a relationship between reflectance and wavelength in Example 5, respectively.
Figure 9B:
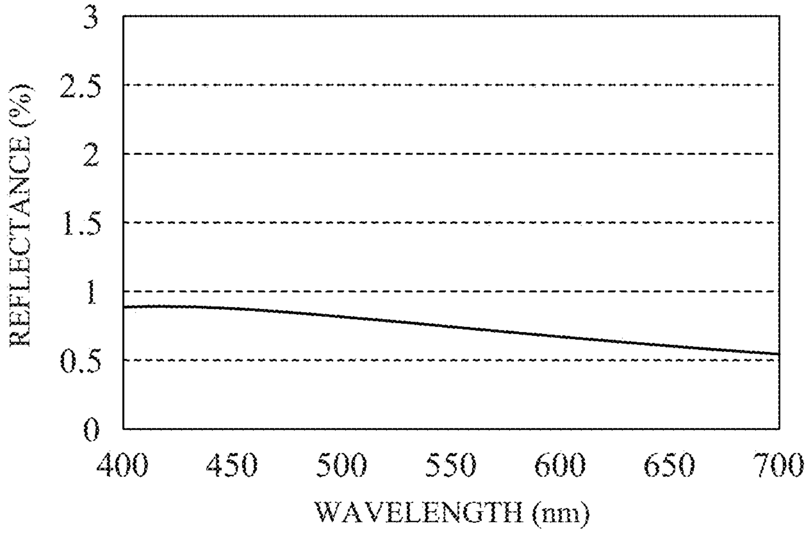

FIG. 9A illustrates the diffraction efficiency calculated using RCWA in the annulus where the minimum value of the array pitch P is=19.4 μm and the grating thickness d1 is 15.39 μm in the DOE according to this example. In FIG. 9A, a horizontal axis represents wavelength (nm), and a vertical axis represents diffraction efficiency (%). FIG. 9B illustrates the reflectance at the grating interface of the DOE according to this example. In FIG. 9B, a horizontal axis represents wavelength (nm), and a vertical axis represents reflectance (%). As illustrated in FIG. 9A, the thin film layer disposed at the grating interface improves the selectivity of the grating material. The configuration that satisfies inequality (4) can achieve high diffraction efficiency of more than 90% in a wide wavelength range in the visible range from 430 nm to 670 nm, despite the narrow pitch configuration with the minimum value of the array pitch P of 19.4 μm. As illustrated in FIG. 9B, properly setting the refractive indices of the thin film layer, the first diffraction grating 8, and the second diffraction grating 9, and the thickness of the thin film layer can provide the DOE having a low reflectance of 1% or less in the wavelength range of the visible range from 430 nm to 670 nm.

In the DOE according to this example, the thin film layer between the grating surfaces of the first diffraction grating 8 and the second diffraction grating 9 can suppress the molten penetration of the resin material, facilitate the selection of the grating material, and thus realize a combination of materials with high diffraction efficiency. Integral molding of the diffraction grating surface using the thermoplastic resin material for the second diffraction grating 9 can provide a less expensive DOE.

Table 1 summarizes values of inequalities of the optical systems according to Examples 1 to 5.

TABLE 1

| | NUMERICAL EXAMPLE | | | | |
|---|---|---|---|---|---|
| | 1 | 2 | 3 | 4 | 5 |
| N1 | 1.6630 | 1.6630 | 1.6630 | 1.6630 | 1.6886 |
| N2 | 1.5880 | 1.5880 | 1.6079 | 1.6160 | 1.6447 |
| N1 − N2 | 0.075 | 0.075 | 0.055 | 0.047 | 0.044 |
| ν1 | 36.8 | 36.8 | 36.8 | 36.8 | 35.9 |
| ν2 | 28.3 | 28.3 | 26.9 | 25.8 | 22.5 |
| 式 (2) | 9.2 | 9.2 | 5.5 | 4.0 | 2.6 |

TABLE 1-continued

| | NUMERICAL EXAMPLE | | | | |
|---|---|---|---|---|---|
| | 1 | 2 | 3 | 4 | 5 |
| P | 45.6 | 45.6 | 45.6 | 19.4 | 19.4 |
| Nf | 1.4678 | 1.4678 | 1.5776 | 1.5888 | 1.5210 |
| df | 40.0 | 40.0 | 61.8 | 80.0 | 70.0 |
| d | 7.46 | 7.46 | 10.43 | 13.53 | 15.39 |
| d/P | 0.16 | 0.16 | 0.23 | 0.70 | 0.79 |
| $\lvert N1 - N2\rvert \times P$ | 3.42 | 3.42 | 2.51 | 0.91 | 0.85 |
| 式 (6) | 12.62 | 12.62 | 7.15 | 8.12 | 20.38 |
| 式 (7) | 0.315 | 0.315 | 0.116 | 0.101 | 0.291 |
| L1 | 0.15 | 0.15 | 0.15 | 0.07 | 0.20 |
| L2 | 3.50 | 3.50 | 3.50 | 3.50 | 3.50 |
| L2/L1 | 23.3 | 23.3 | 23.3 | 50.0 | 17.5 |
| dfmn | — | 20.00 | 18.54 | 56.00 | 35.00 |
| dfmn/df | — | 0.5 | 0.3 | 0.7 | 0.5 |
| 式 (13) | — | 6.3 | 5.0 | 2.4 | 10.2 |
| w | — | 4.0 | 6.0 | 13.0 | 11.0 |
| w/(P × d) | — | 0.012 | 0.013 | 0.050 | 0.037 |

EXAMPLE 6

Figure 10:
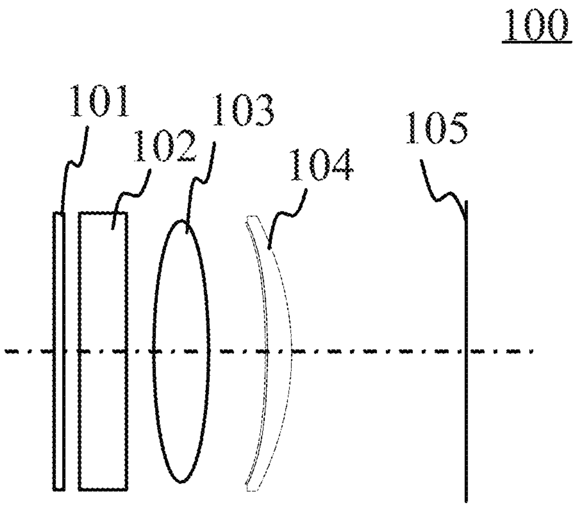
FIG. 10 is a configuration diagram of an optical system having the DOE according to any one of the examples.

Referring now to FIG. 10, a description will be given of an optical system (observation optical system) 100 according to Example 6. FIG. 10 is a configuration diagram of the optical system 100. In FIG. 10, reference numeral 101 denotes a display panel such as an LCD, reference numeral 102 denotes an optical path branching unit, reference numeral 103 denotes a correction lens, and reference numeral 105 denotes a pupil surface or plane. Reference numeral 104 denotes a DOE according to any one of Examples 1 to 5, which is provided to correct chromatic aberration of the correction lens 103 and the like.

As described in each of the above examples, the optical system 100 has a structure that has high diffraction efficiency, is easy to manufacture, and is less expensive. The optical system 100 is applicable to an observation optical system such as a ground telescope or an astronomical observation telescope, an observation optical system for a head mount display (HMD), and an optical viewfinder such as a lens shutter camera or a video camera, and exhibits effects similar to those described above. In this example, one DOE is disposed in the optical system 100, but the embodiment is not limited to this example, and a plurality of DOEs may be disposed in the imaging lens.

EXAMPLE 7

Figure 11:
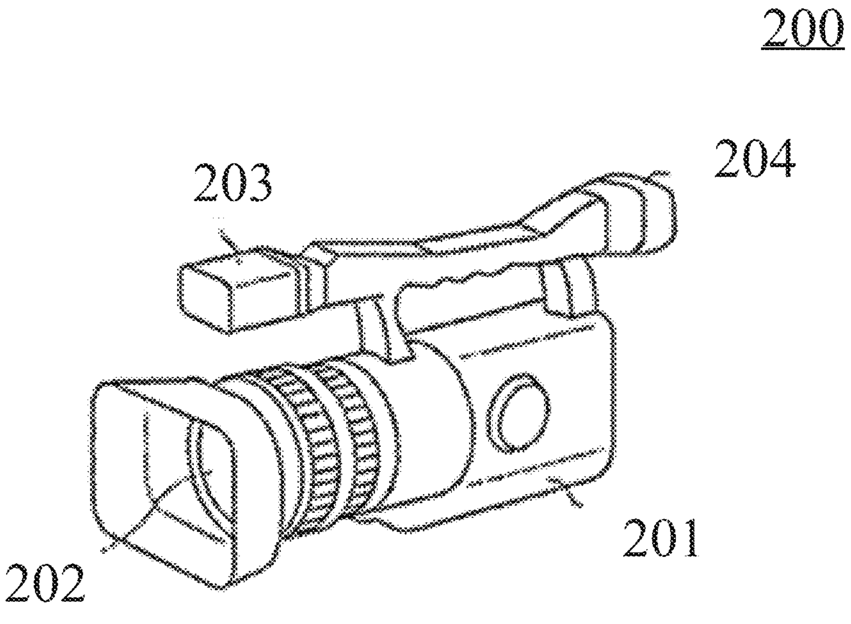
FIG. 11 is a schematic diagram of an image pickup apparatus having the DOE according to any one of the examples.

Referring now to FIG. 11, a description will be given of an image pickup apparatus (video camera) 200 according to Example 7. FIG. 11 is a schematic diagram of the image pickup apparatus 200. In FIG. 11, reference numeral 201 denotes a video camera body, reference numeral 202 denotes an imaging optical system configured to form an object image on an unillustrated image sensor, and reference numeral 203 denotes a sound collecting microphone. Reference numeral 204 denotes an observation apparatus (electronic viewfinder, display apparatus) for enabling the user to observe an object image displayed on an unillustrated display element via an observation optical system, such as the optical system 100 according to Example 6. The display element includes a liquid crystal panel or the like, and the object image formed by the imaging optical system 202 is displayed on the display element.

Thus, the optical system 100 according to Example 6 can be applied to the image pickup apparatus 200 such as a video camera. This example provides the image pickup apparatus 200 having an eyepiece optical system (observation optical system) that can secure sufficient space for the optical path branching unit 102 in the optical system 100, have a wide viewing angle, sufficiently correct various aberrations such as curvature of field and astigmatism. The eyepiece optical system according to this example is applicable not only to the video camera illustrated in FIG. 11 but also, for example, to a lens interchangeable type mirrorless camera and HMD.

Figure 12:
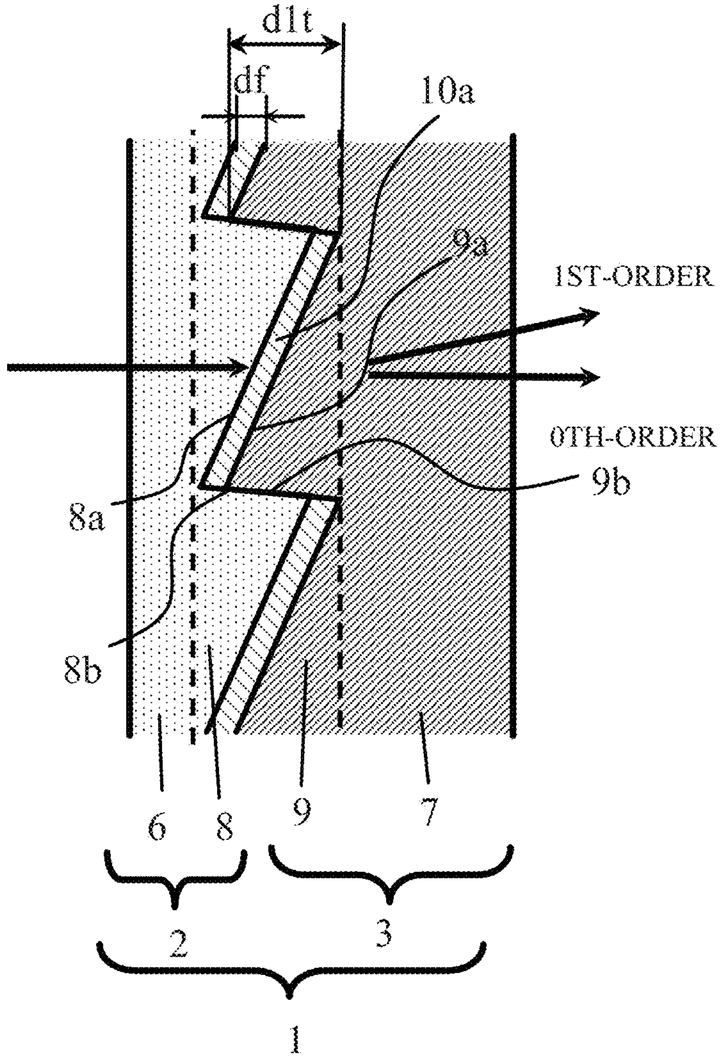
FIG. 12 is a side view of a DOE according to a modification of Examples 1 to 5.

In each example, the dielectric thin film 10*a* on the grating slopes and the dielectric thin film 10*b* on the grating wall surfaces are formed as thin film layers, but the example is not limited to this implementation. For example, as illustrated in FIG. 12, the effects of each example can be obtained even with a configuration in which only the dielectric thin film 10*a* is formed on the grating slopes and the dielectric thin film 10*b* is not formed on the grating wall surfaces.

Each example can provide a high-performance DOE that has a simple structure and high diffraction efficiency in the entire visible range, and can suppress molten penetration between resins. Each example can also provide an optical system using the DOE in which various aberrations such as chromatic aberration and flare are satisfactorily reduced. Therefore, each example can provide a DOE, an optical system, an image pickup apparatus, and a display apparatus, each of which is easy to manufacture and have high optical performance.

While the disclosure has been described with reference to embodiments, it is to be understood that the disclosure is not limited to the disclosed embodiments. The scope of the following claims is to be accorded the broadest interpretation so as to encompass all such modifications and equivalent structures and functions.

Each example can provide a DOE that is easy to manufacture and has high optical performance.

This application claims the benefit of Japanese Patent Application No. 2023-010695, filed on Jan. 27, 2023, which is hereby incorporated by reference herein in its entirety.

What is claimed is:

1. A diffractive optical element comprising:

a first diffraction grating made of a first material;

a second diffraction grating made of a second material; and a thin film layer that includes an inorganic material, wherein the diffractive optical element includes a plurality of annular areas each including annuli arrayed in a radial direction, and array pitches of the annuli of each annular area are different from each other, wherein, in each of the annuli, the first diffraction grating includes a first grating slope and a first grating wall surface adjacent to each other, and the second diffraction grating includes a second grating slope and a second grating wall surface adjacent to each other, wherein each of the first grating slope and the second grating slope includes effective area through which effective light passes, wherein the first grating slopes and the second grating slopes are in contact with each other via the thin film layer, wherein the thin film layer between the first grating slope and the second grating slope includes a first portion having a thickness that decreases toward the first grating wall surface and the second grating wall surface in another annulus, wherein the thin film layer between the first grating slope and the second grating slope includes a second portion having a constant thickness, and wherein the following inequalities are satisfied:

$$0.4 < |N1 - N2| \times P < 6.0$$

$$0 \leq |N1 + N2 - 2 \times Nf| \times df < 40$$

where P (μm) is a minimum value of the array pitches, N1 and N2 are refractive indices for a design wavelength of the first diffraction grating and the second diffraction grating in at least one of the plurality of annular areas, respectively, Nf is a refractive index for the design wavelength of the thin film layer between the first grating slope and the second grating slope, and df (nm) is a maximum value of a thickness of the thin film layer between the first grating slope and the second grating slope.

2. The diffractive optical element according to claim 1, wherein the following inequality is satisfied:

$$1.0 < (N1 - N2)/(1/v21/v1) < 20.0$$

where v1 and v2 are Abbe numbers of the first diffraction grating and the second diffraction grating based on d-line, respectively.

3. The diffractive optical element according to claim 1, wherein the following inequality is satisfied:

$$10 < P < 80.$$

4. The diffractive optical element according to claim 1, wherein the second material is a thermoplastic resin.

5. The diffractive optical element according to claim 1, wherein the first material is an ultraviolet curable resin.

6. The diffractive optical element according to claim 1, wherein the following inequality is satisfied:

$$5 < L2/L1 < 200$$

where L1 is a thickness on an optical axis of a first lens made of the same material as that of the first diffraction grating, and L2 is a thickness on the optical axis of a second lens made of the same material as that of the second diffraction grating.

7. The diffractive optical element according to claim 1, wherein the following inequality is satisfied:

$$0.001 < |N1 + N2 - 2 \times Nf| < 0.600.$$

8. The diffractive optical element according to claim 1, wherein the following inequality is satisfied:

$$0.02 < N1 - N2 < 0.15.$$

9. The diffractive optical element according to claim 1, wherein the following inequality is satisfied:

$$3 < df < 200.$$

10. The diffractive optical element according to claim 1, wherein the following inequality is satisfied:

$$0.10 < dfmn/df < 0.95$$

where dfmm is a minimum value of the thickness of the thin film layer between the first grating slope and the second grating slope.

11. The diffractive optical element according to claim 10, wherein the following inequality is satisfied:

$$0.2 < |dfs \times (N1 + N2 - 2 \times Nf)| < 30.0$$

where dfs is a difference between the maximum value and the minimum value of the thickness of the thin film layer between the first grating slope and the second grating slope.

12. The diffractive optical element according to claim 1, wherein the following inequality is satisfied in an annular area having a minimum array pitch:

$$0.002 < w/(P \times d) < 0.100$$

where w (μm) is a width of the first portion in an array direction of the annular sections, and d (μm) is a grating height.

13. The diffractive optical element according to claim 1, wherein the first grating wall surface and the second grating wall surface are in close contact with each other via the thin film layer, and the thin film layer between the first grating wall surface and the second grating wall surface is thinner than the thin film layer between the first grating slope and the second grating slope.

14. The diffractive optical element according to claim 1, further comprising a lens made of the first material, wherein the following inequality is satisfied in an effective area of the diffractive optical element:

$$2 < \mathrm{Ah} < 50$$

where Ah (deg) is an angle formed between the second grating wall surface and an optical axis of the lens in a section including the optical axis.

15. An optical system comprising the diffractive optical element according to claim 1.

16. An image pickup apparatus comprising:

the optical system according to claim 15; and an image sensor configured to receive an optical image formed by the optical system.

17. A display apparatus comprising:

a display element configured to display an image; and the optical system according to claim 15 configured to guide light from the display element.

* * * * *